United States Patent [19]

Cremona

[11] Patent Number: 4,742,745

[45] Date of Patent: May 10, 1988

[54] ROTARY CUTTER FOR SHEET MATERIALS, IN PARTICULAR WOOD VENEERS

[75] Inventor: Angelo Cremona, Monza, Italy

[73] Assignee: Angelo Cremona & Figlio S.p.A.

[21] Appl. No.: 910,900

[22] Filed: Sep. 24, 1986

[30] Foreign Application Priority Data

Sep. 25, 1985 [IT] Italy .................................. 23219[U]

[51] Int. Cl.[4] ............................................ B23D 25/02

[52] U.S. Cl. ....................................... 83/344; 83/346; 83/700

[58] Field of Search ................. 83/344, 346, 347, 699, 83/700; 384/583; 464/178

[56] References Cited

U.S. PATENT DOCUMENTS

| | | | |
|---|---|---|---|
| 3,808,925 | 5/1974 | Hards | 83/346 OR |
| 4,341,525 | 7/1982 | Wittkopf | 83/344 X |
| 4,553,461 | 11/1985 | Belongia | 83/344 OR |
| 4,641,558 | 2/1987 | Hoffman | 83/344 X |

*Primary Examiner*—Frank T. Yost
*Attorney, Agent, or Firm*—Toren, McGeady & Associates

[57] ABSTRACT

A rotary cutter for sheet materials, particularly wood veneers, comprising a blade (11) controlled to rotate between two supporting rolls (12, 13), which are upper and lower respectively and which are also rotary, wherein each of the supporting cylinders (12, 13) rests on at least a pair of travelling rolls (14, 15 and 16, 17), which can be reciprocally neared and/or distanced through the intermediary of actuating means which cooperate with them.

2 Claims, 3 Drawing Sheets

ROTARY CUTTER FOR SHEET MATERIALS, IN PARTICULAR WOOD VENEERS

Rotary cutters are known for sheet materials, in particular wood veneers, which are structurally composed of a blade controlled to rotate between two supporting rolls which are lower and upper respectively.

The axes of rotation of the blade and the supporting rolls lie in one and the same vertical plane and the veneer, which is continuously fed by a conveyor designed for the purpose, is cut to measure as it passes between the vertically disposed blade and the lower supporting roll.

A machine of this type is for example described and illustrated in the U.S. Pat. No. 3,808,925.

Though a cutter of such kind assures an excellent quality of cut, it is very complex and costly to manufacture on account of the supporting roll system.

The lower supporting roll is in fact mounted on the frame of the machine and can be micrometrically adjusted, while the upper supporting roll is carried by a forked girder with a hydraulic lift system, in addition to a micrometric adjustment mechanism equivalent to that of the lower supporting roll.

The hydraulic lifting system for the upper roll entails the use of an oleodynamic gearbox which not only has an appreciable incidence on the cost of the machine but requires close maintenance.

Moreover, with the above described roll mounting system the heavy workloads are supported directly by the end bearings of the rolls which rapidly become worn and cause defects in the cutting of the veneer.

The objects of the present invention is to obviate the aforesaid difficulties by embodying a cutter of the type mentioned in which the blade supporting rolls are mounted on the machine frame by a system which, though much more simple and economical than the aforesaid known system, is dependable in operation, has long-life expectancy, and is straightforward and rapid as to use and maintenance.

To attain the said object, the present invention embodies a rotary cutter for sheet materials, particularly wood veneers, comprising a blade (11) controlled to rotate between two supporting rolls (12, 13) which are upper and lower respectively and also rotatable, wherein each of the supporting rolls (12, 13) rests against at least a pair of travelling rolls (14, 15 and 16, 17) which can be caused to approach and/or move away from each other by actuating means cooperating with them.

The structural and functional characteristics of the invention, and its advantages over the known art, will become more apparent from an examination of the following description, referred to the appended drawings which illustrate an example of practical embodiment thereof.

With reference to the drawings, the said machine is composed structurally of a frame indicated overall by 10 on which is mounted a blade 11 which can be controlled to rotate between two supporting rolls 12, 13 which are also rotary and which are lower and upper respectively.

Figure 1:
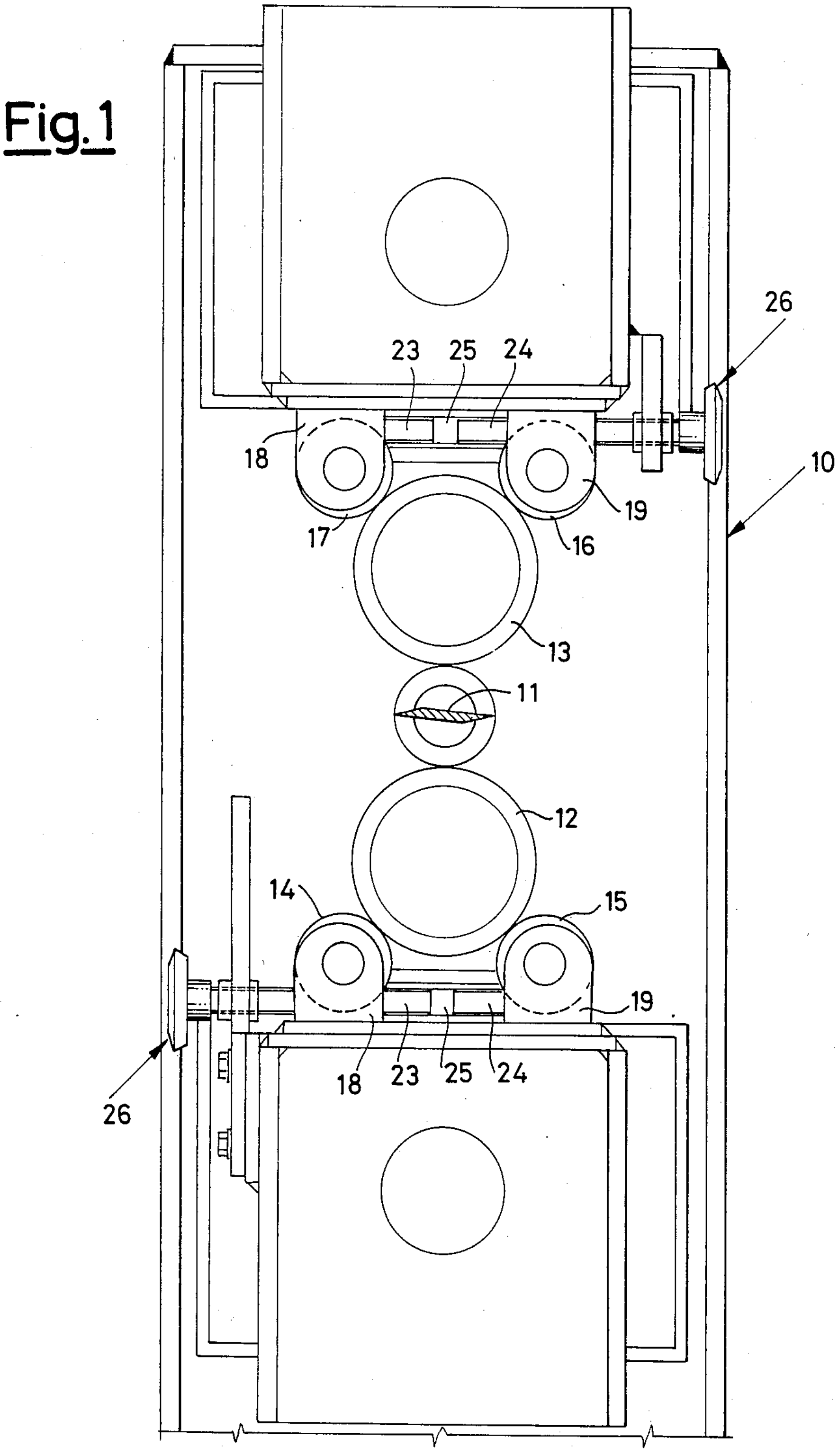
FIG. 1 is a diagrammatic side elevational view of a rotary cutter embodied according to the teachings of the invention.

As FIG. 1 of the drawings clearly shows, the axes of rotation of the blade 11 and supporting rolls 12, 13 lie in one and the same vertical plane.

As a machine of this type is well-known to persons with ordinary skill in the art it will not here be described in greater detail; the relevant technology may be better understood from the aforesaid U.S. Pat. No. 3,808,925.

According to the present invention, the supporting rolls 12, 13 each rest on one or more pairs of freely rotating rolls 14, 15 and 17, 17 which have the dual function of taking the thrust and adjusting the position of the supporting rolls 12, 13 with respect to the blade 11 in relation to the type and thickness of the material being processed and also in relation to the degree of wear of the blade 11.

Figures 3, 4:
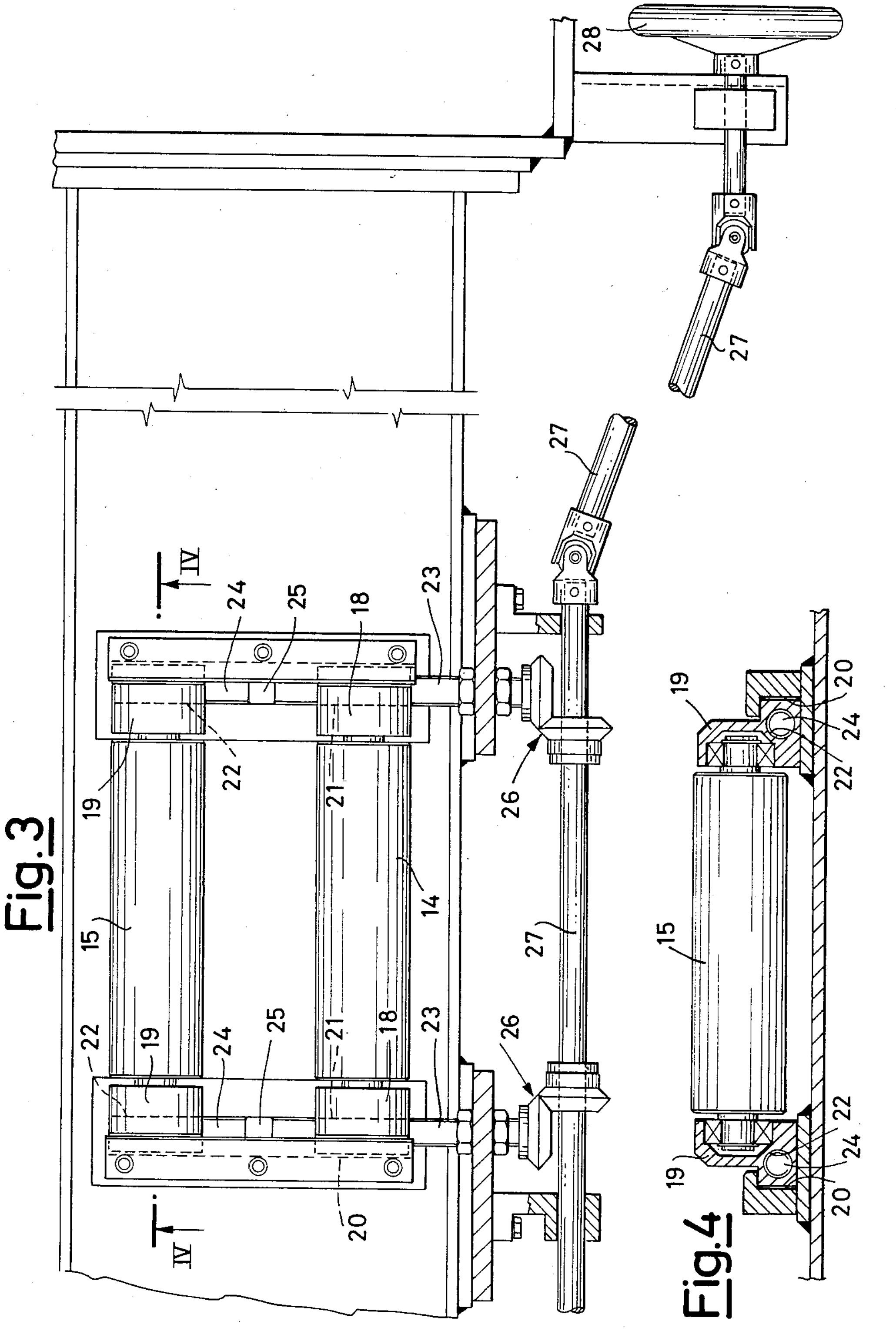
FIG. 3 is a plan view illustrating a pair of travelling rolls for the rotary cutter blade supporting rolls.
FIG. 4 is a sectional view taken on the line IV—IV of FIG. 3.

As can be clearly seen from FIGS. 1, 3 and 4 of the drawings, the travelling rolls 14, 15 and 16, 17 of each pair are mounted so that they can be made to approach and or move away from each other, thus causing respectively a reciprocal approach or distancing of the supporting rolls 12, 13 with respect to the blade 11 in the aforesaid vertical plane in which their axes of rotation all lie.

This is achieved by mounting the rolls of each pair on end slides 18, 19 which move on guides 20 (FIGS. 3 and 4).

Nut screws 21, 22, right-hand threaded and left-hand threaded respectively, are formed through the slides 18 and complementary parts 23, 24 of screws 25 are coupled thereto.

As FIG. 3 of the drawings clearly show, the screws 25 are connected through the intermediary of crown wheel and pinion to an actuating shaft 27 which is articulated into several parts and which can be controlled to rotate for example by means of a handwheel 28.

The shaft 27 could also be controlled by a power unit.

Figure 2:
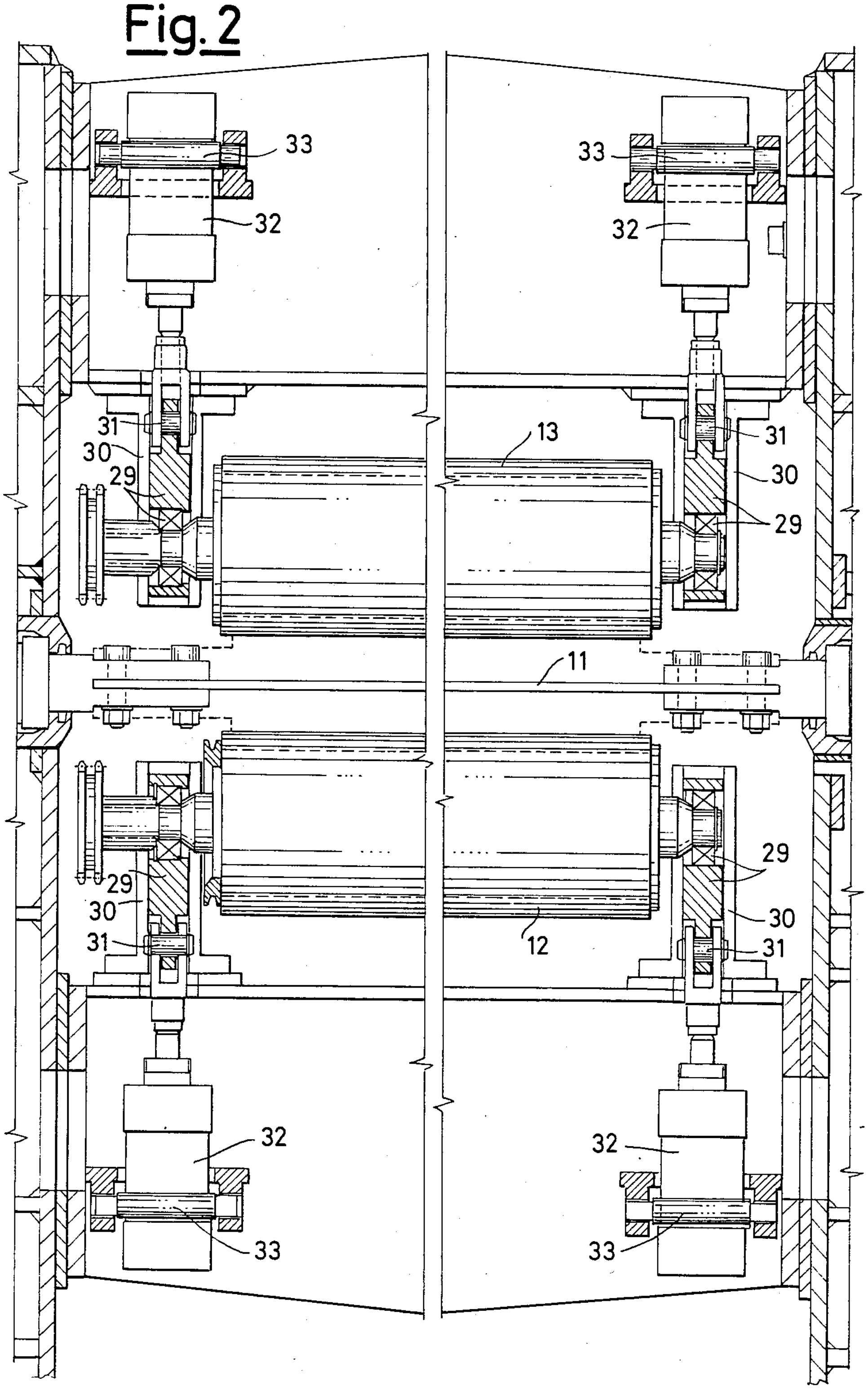
FIG. 2 is a sectional view taken on the line II—II of FIG. 1.

FIG. 2 of the drawings show how, in order to be able translate in the aforesaid vertical plane, the supporting rolls 12, 13 are supported by end bearing 29 slidable within guide supports 30. The bearings 29 are each pivoted at 31 to the stem of pneumatic cylinders 32 which are in turn pivoted at 33 to the machine frame 10.

The pneumatic cylinders 32 at all times ensure a perfect adherence between the supporting rolls 12, 13 and the pairs of travelling rolls 14, 15 and 16, 17.

The support system for the supporting rolls 12, 13 according to the present invention has an appreciable advantage over the known art inasmuch as it can be wholly mechanical, thus not requiring the costly oleodynamic gearbox used for raising the girder which carries the upper roll in the machine forming subject matter of U.S. Pat. No. 3,808,925.

Another advantage of the system according to the present invention is that the work loads are taken by the travelling adjustment rolls 14, 15 and 16, 17 instead of by the bearings of the supporting rolls, which thus assure a perfectly satisfactory quality of cut over time.

Provision can also be made for several travelling adjustment rolls for one and the same supporting roll, which can thus be made to move in particular ways with respect to the blade 11, in relation to a very wide variety of processing requirements.

I claim:

1. A rotary cutter for sheet materials, particularly wood veneers, comprising a blade (11) controlled to rotate between two supporting rolls (12, 13), which are upper and lower respectively and which are also rotary, wherein each of the supporting cylinders (12, 13) rests on at least a pair of travelling rolls (14, 15 and 16, 17), which can be reciprocally neared and/or distanced through the intermediary of actuating means which cooperate with them.

2. A cutter as described in claim 1, wherein the said actuating means comprise screw mechanisms—nut screws (21, 22, 23, 24 and 25) associated with slides (18, 19) carrying the travelling rolls (14, 15 and 16, 17) and moving on guides.

* * * * *